United States Patent Office 3,438,269
Patented Apr. 15, 1969

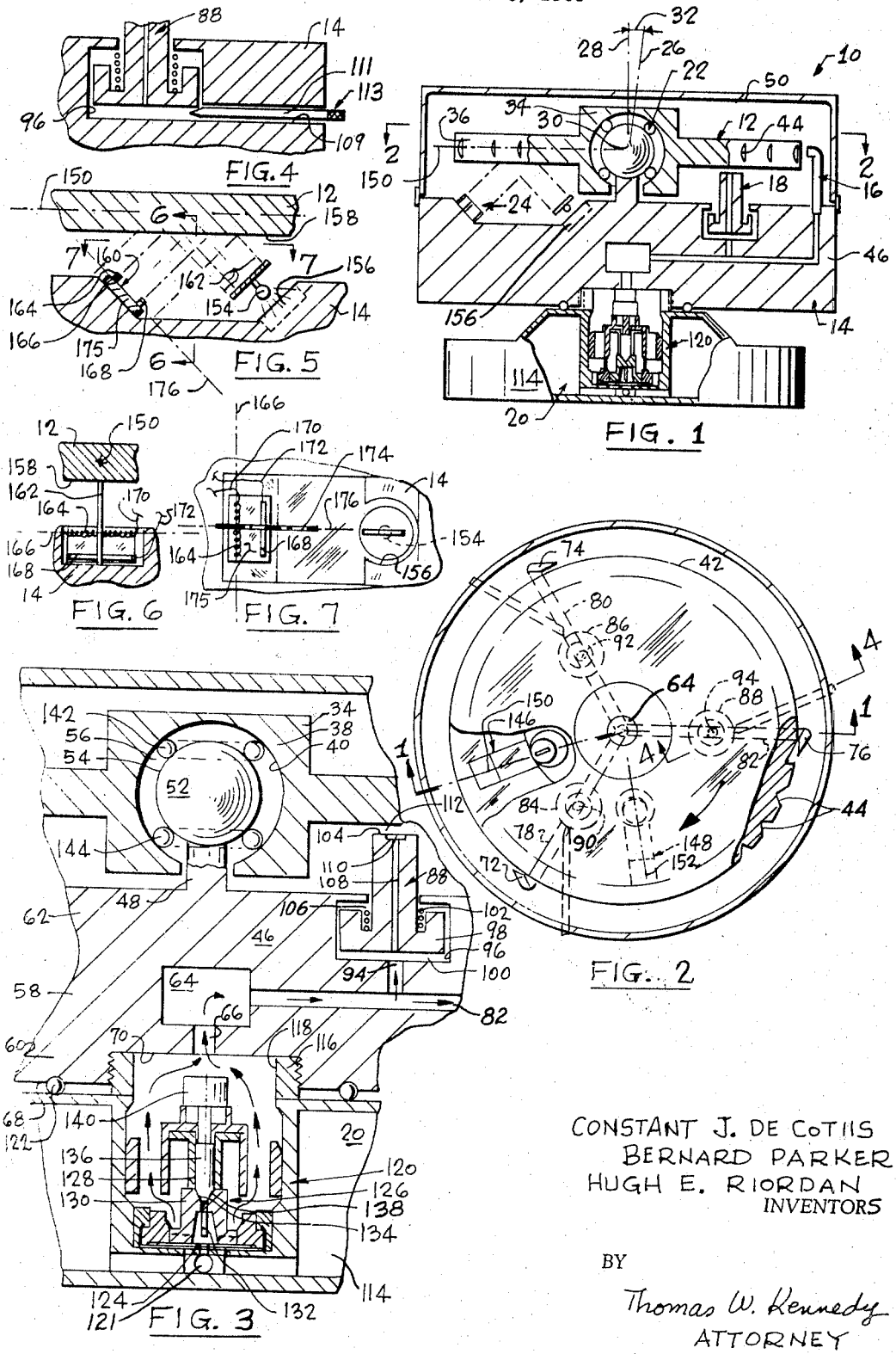

3,438,269
FREE-ROTOR GYRO
Constant J. De Cotiis, Cranford, Bernard Parker, Teaneck, and Hugh E. Riordan, Wyckoff, N.J., assignors to Singer-General Precision, Inc., a corporation of Delaware
Filed Oct. 5, 1965, Ser. No. 493,116
Int. Cl. G01c 19/24, 19/30
U.S. Cl. 74—5.12                12 Claims

ABSTRACT OF THE DISCLOSURE

A two-axis free-rotor gas driven gyro wherein the drive means and caging means use a single gas supply source and optical pickoffs are used to calibrate the caging mechanism prior to caging and spin-up operation.

---

The present invention relates to a two-axis, free-rotor gyro, and particularly to a gas-driven, two-axis, free-rotor gyro which has a gas-type caging means.

A conventional gas-driven, two-axis, free-rotor gyro is described in U.S. Patent No. 3,115,784, which is assigned to the same assignee as in this invention. Said conventional gas-driven, two-axis, free-rotor gyro includes a stator, a rotor journaled on the stator for tilting in any direction and for rotation relative to said stator, and antifriction gas bearing disposed between the rotor and the stator, a gas drive including a plurality of tangential rotor nozzles for spinning the rotor up to operating speed, caging means including means to redirect the gas jets from the nozzles to the side of the rotor for caging the rotor and for axially aligning the rotor and stator during spin-up, and an electromagnetic pickoff means for sensing the angle and direction of tilt of the rotor relative to the stator.

One problem with said conventional gas-driven, two-axis, free-rotor gyro using a redirected drive jet as a caging means is the difficulty of accurately caging the rotor and of aligning its rotor axis with its stator axis during the spin-up operation, particularly if the rotor is subject to a high-acceleration shock load.

In accordance with one embodiment of the present invention, the difficulty in accurately caging the rotor is substantially avoided by using a plurality of gas-film caging mechanism bearing pads, which are disposed alongside the rotor end face.

Accordingly, it is one object of the invention to provide a gas-driven, two-axis, free-rotor gyro with a high-accuracy, low-friction, low-torquing, shock-resistant, gas-type rotor-aligning caging means.

It is another object of the invention to provide a gyro according to the aforementioned object, which has a high-stiffness, shock-resistant rotor bearing for minimizing rotor axis misalignment during caging.

It is still another object of the invention to provide a gyro according to the aforementioned objects, which has a sensitive reactionless pickoff means for sensing rotor tilt angle during and after spin-up and for calibrating the caging means before spin-up.

To the fulfillment of these and other objects, the invention provides a two-axis, free-rotor gyro comprising a rotor, a stator, a drive means, and a gas caging means. Said rotor has a spin axis with a pivot point thereon. Said stator has a stator axis, which intersects said spin axis at said pivot points forming a tilt angle therebetween. Said drive means is used to spin up said rotor at gyro start-up condition. Said gas caging means includes a plurality of peripherally spaced caging mechanisms, which have respective gas-film bearing faces for aligning said rotor and stator axes during spin-up.

Other objects of the invention will become apparent upon reading the annexed detailed description in connection with the drawings, wherein like parts are designated by like numerals throughout the several views, and wherein:

FIG. 1 is a sectional view of a two-axis, free-rotor, gas-driven gyro embodying features of the present invention;
FIG. 2 is a sectional view taken along line 2—2 of FIG. 1;
FIG. 3 is an enlarged portion of FIG. 1;
FIG. 4 is a sectional view taken along line 4—4 of FIG. 2;
FIG. 5 is another enlarged portion of FIG. 1;
FIG. 6 is a sectional view taken along the line 6—6 of FIG. 5; and
FIG. 7 is a sectional view taken along the line 7—7 of FIG. 5.

Referring to FIG. 1, one embodiment of the present invention is a two-axis, free-rotor, gas-driven gyro 10, which includes a rotor 12, and a stator 14 for support of rotor 12.

Gyro 10 also has a gas drive means 16 to spin up rotor 12 at start-up condition to a desired operating speed level, a gas caging means 18 for positioning rotor 12 relative to stator 14 during said spin-up, a gas supply means 20, a ball-bearing means 22 and an optical pickoff means 24. Optical pickoff means 24 senses the tilting of rotor 12; ball bearing means 22 provides a low-friction coupling of rotor 12 to stator 14; and gas supply means 20 is the source of the gas supply to said drive 16 and cage 18.

Rotor 12 (FIGS. 1, 2) has a spin axis 26; and stator 14 has a longitudinal axis 28. Spin axis 26 has a pivot point 30 at which said axes 26, 28 intersect making a slight angle of tilt 32 therebetween. Pivot point 30 is preferably also the mass center of gravity of rotor 12 to minimize rotor unbalance.

Rotor 12 (FIGS. 1, 2, 3), which is in the shape of a wheel, has a hub portion 34 and a rim portion 36. Hub 34 has a bearing portion 38, which has a spherically shaped, radially inner bearing surface 40. Rim 36 has an outer edge 42, which faces in a radially outward direction. Edge 42 has a plurality of turbine-bucket grooves 44, which are equispaced about axis 28.

Stator 14 (FIGS. 1, 2, 3) includes a base portion 46 of cylindrical profile, which is symmetrically disposed about axis 28; and stator 14 includes a shaft 48, which is fixedly connected to base 46 coaxially therewith. Stator 14 has a cap member 50, which is connected to and supported by base 46 for enclosing rotor 12. Shaft 48 has a ball portion 52, which has a spherically shaped, radially outer bearing surface 54, that is separated from surface 40 by a substantially uniform gap 56. Base 46 has a peripheral wall 58 and a pair of axially spaced end walls 60, 62, which together form a cavity 64. Lower wall 60 has a passage 66, which connects gas supply 20 to cavity 64 for supply thereto. Lower wall 60 has an end face 68 with a recess 70.

Drive 16 (FIGS. 1, 2) has a plurality of gas nozzles 72, 74, 76, which have respective passages 78, 80, 82, that connect to cavity 64 at the radially inner ends thereof. Nozzles 72, 74, 76 are equiangularly spaced about axis 28 and direct their turbine outflow jets at buckets 44, which are disposed adjacent thereto for spin-up of rotor 12.

Cage means 18 (FIGS. 1, 2, 3) includes three caging mechanisms 84, 86, 88, which are equiangularly spaced about axis 28, and which have respective supply passages 90, 92, 94 that connect to respective gas nozzle passages 78, 80, 82 for supply of gas thereto.

Cage mechanism 88, which is described in detail hereafter and which is identical to cage mechanisms 84, 86, has a cylindrical portion 96, that is formed by a cylindrical recess in wall 62. Caging mechanism 88 also has a piston 98, which is received in cylinder 96 forming a chamber 100 therebetween. Chamber 100 is connected to cavity 64 by passages 94, 82 for gas supply thereto. Gas pressure in chamber 100 urges piston 96 axially outwardly in an extended or operating position.

Cage mechanism 88 also has a spring means 102, which is disposed in cylinder 96 adjacent to the upper end of piston 98 for urging piston 98 axially downward in a retracted or shutdown position. Spring 102 urges piston 98 to return to its retracted position when the gas flow to chamber 100 from cavity 64 and supply 20 is exhausted.

Piston 98 has an upper end face 104 and an annular peripheral recess 106, which accommodates spring 102 inside cylinder 96 so that the piston is thereby pushed down inside cylinders 96. Piston 98 also has a conduit 108, which extends therethrough and which has a flow-restricting opening 110 in face 104 for providing a lubricating gas film on face 104. Face 104 is separated from rotor underside by a gap 112, which contains a gas film, that lubricates and supports rotor 12 during the spin-up of rotor 12 to its operating speed. With this construction, cage means 18 aligns axes 26 and 28, and prevents tilting of rotor 12 relative to stator 14 during the spin up of rotor 12 whereby gyro error due to a precession of gyro 10 caused by a tilting of rotor 12 during spin-up is substantially eliminated.

Cylinder 96 (FIG. 4) has a radial passage 109, which extends from cylinder 96 in a radial direction through wall 62 to the radially outer end thereof. Cylinder 96 has a plunger pin 111 that is received therein for rough caging of rotor 12 prior to start up. Pin 111 is urged radially outwardly in a limited displacement relative to passage 109 by gas pressure in cylinder 96. Plunger pin 111 has a radially outer pushbutton end 113, which extends radially outwardly from stator 14 for resetting pin 111 manually.

Gas supply 20 (FIGS. 1, 3) has a compressed gas bottle 114, which is coaxial with stator 14 along axis 28. Bottle 114 has a cylindrical flange 116, which is received in recess 70. Flange 116 has an opening 118, which connects to passage 66 for supply to cavity 64. Bottle 114 has a gas release mechanism 120, which is disposed in opening 118.

In operation, supply 20 provides gas at a very high initial gas pressure at release and at rotor spin up, the gas pressure gradually lowers to a very low terminal gas pressure before exhaustion. Flange 116 has an O-ring seal 121, which bears against end face 68 for sealing the joint between stator 14 and bottle 114.

The gas supply 20 feeds gas to the release mechanism by an opening 121. Release mechanism 120 (FIG. 3) includes a diaphragm 124, at the bottom thereof, while the top portion is fixedly connected on its radially outer edge to flange 116 for sealing opening 118. Release mechanism 120 also has a two-piece diaphragm-support tube assembly 126, which includes an upper thin-wall tube 128 and a lower tube 130 coaxial therewith. Lower tube 130 has a plurality of radial sawcuts 132, which extend in an axial direction from one end thereof through its tube wall. Lower tube 130 has about the same size outer diameter as upper tube 128. Lower tube 130 also has a tapered, radially inner surface 134.

Release mechanism 120 also includes a drive rod 136, which is disposed within both tubes 128 and 130 coaxially therewith. Rod 136 has a tapered, radially outer surface 138, which engages surface 134. With this construction, an axial force acting on rod 136 urges lower tube 130 to expand radially thereby breaking rod 136 into longitudinal strips, which are urged around upper tube 128 due to gas pressure. In this way, the column action of tube assembly 126 is destroyed and the axial reaction of tube assembly 126 against diaphragm 124 is eliminated.

Release mechanism 120 also has an electrical actuator 140, which engages rod 136 coaxially therewith. Actuator 140 is energized by an external source (not shown). When energized, actuator 140 urges rod 136 against lower tube 130 thereby opening bottle 114. With this construction, release mechanism 120 provides a high-volume, high-velocity, instantaneous-release gas flow from bottle 114 to cage means 18 and to drive means 16 during the caging and spin up operation.

Ball bearing 22 (FIGS. 1, 3) includes an upper ball-bearing unit 142 and a lower ball-bearing unit 144, both of which are disposed in gap 56. Units 142, 144 engage and cooperate with bearing surfaces 40, 54. Bearing surfaces 40, 54 and ball-bearing units 142, 144 form a universal-joint, high-stiffness, shock-resistant rotor bearing. With this construction, rotor axis misalignment is minimized during the caging operation whereby gyro drift error is also minimized.

Optical pickoff means (FIGS. 1, 2) includes an X-pickoff unit 146 and a Y-pickoff unit 148, which are disposed substantially at right angles to each other in a plane that is disposed substantially at right angles to stator axis 28. For ease of illustration, units 146, 148 have respective X-reference axis 150 and Y-reference axis 152, which are disposed substantially at right angles to each other in a plane that is disposed substantially at right angles to stator axis 128.

Pickoff unit 146 is identical to pickoff unit 148 and is described in detail hereafter. Pickoff 146 includes a light source 154, such as a light bulb, which is mounted on stator 14; and pickoff 146 includes a light beam focus 156, which is integral with stator 14. Focus 156 is preferably a concave recess in stator wall 62 on the upper side thereof. Pickoff 146 has a light beam reflector 158, which is integral with rotor 12 and which is preferably a mirror-finish surface portion of rotor 12 on the under side thereof. Pickoff 146 also has a light receiver 160, which is mounted on stator 14. Source 154 and focus 156 generate a light beam 162, which is directed on reflector 158 and which is redirected by reflector 158 on to receiver 160. Reflector 158 tilts about X-reference axis 150 and senses only the component of tilt angle 32 which rotates about axis 150.

Receiver 160 includes an elongated coil 164 with a coil axis 166, which is disposed substantially at right angles to a plane including axis 150 and stator axis 28. Receiver 160 also has a longitudinal bar 168, which is radially spaced from and parallel to coil 164 and its axis 166. Coil 164 and bar 168 have respective leads 170, 172 at adjacent ends thereof.

Light beam 162 has a long, narrow, cross-sectional light band 174 where beam 162 reflects on receiver 160. Light band 174 conducts current from coil 164 to bar 168 in the following manner.

Receiver 160 has a photoconductive sheet 175, which is fixedly joined to and which underlies coil 164 and bar 168. Coil 164 is preferably a high-resistive, thin-film strip, which is deposited on sheet 175. Bar 168 is a high-conductive, thin-film strip, which is also deposited on sheet 175. Sheet 175 is preferably a thin film of photoconductive material. Sheet 175 is normally non-conductive, but sheet 175 is highly conductive in that portion on which light is shone.

Light band 174 has an axis of symmetry 176 for illustration purposes, which is disposed substantially at right angles to coil axis 166. Light band 174 is very long relative to the distance between coil 164 and bar 168. When rotor 12 is tilted, light band 174 always overlaps and crosses both coil 164 and bar 168. In this way, when rotor 12 tilts about Y-axis 152 and band 174 moves in a direction substantially at right angles to coil axis 150, the point of intersection of band 174 with coil 164 does not change. However, a tilt of rotor 12 about X-axis 150 causes band 174 to move parallel to coil axis 166 and to change its point of intersection of band 174 with coil 164. In this way, the circuit resistance of coil 164 changes with the point of intersection with band 174. Further, the resistance of coil 164 varies with the component of the tilt angle 32 acting about X-axis 150, that is, the component of tilt angle 32 which is disposed in a plane including stator axis 28 and Y-axis 152. With this construction, cross-coupling pickoff error is eliminated. Moreover, pickoff units 146, 148 sense the vectorial components of tilt angle 32 acting about their respective axes 150, 152 thereby facilitating the design of electronic hardware (not shown) for indicating the amount and direction of tilt angle 32.

In summary, this invention provides a gas-driven, two-axis, free-rotor gyro, which has a high-accuracy, low-friction, low-torquing, shock-resistant, gas-type caging means, which has a high-stiffness, shock-resistant rotor bearing, and which has a sensitive reactionless pickoff means for calibrating the caging means.

While the present invention has been described in a preferred embodiment, it will be obvious to those skilled in the art that various modifications can be made therein within the scope of the invention. It is intended that the appended claims cover all such modifications.

What is claimed is:
1. A two-axis, free-rotor gyro, comprising:
a rotor with a spin axis having a pivot point thereon;
a stator with a stator axis intersecting said spin axis at said pivot point and forming a tilt angle therebetween;
a universal-type ball-bearing means on said rotor journaled in said stator;
a gas-type caging means including a plurality of peripherally spaced caging mechanisms with respective gas-film bearing faces for aligning said rotor and said stator axes during spin-up;
a drive means to spin up said rotor at start up of said gyro, said drive means being a gas-type drive means having a common supply passage connecting said caging means so that a single supply source can be used;
a high pressure, gas-supply release mechanism in said stator;
a first optical pickoff unit with an X-reference axis disposed substantially at right angles to said stator axis and activated only by tilting of said rotor about said X-reference axis; and
a second optical pickoff unit with a Y-reference axis disposed substantially at right angles to a plane including said stator axis and said X-reference axis and activated only by tilting of said rotor about said Y-reference axis
whereby rapid calibration of said caging means by said pickoff means prior to the caging and spin-up operation is provided.

2. A gyro as claimed in claim 1, in which each caging mechanism has a cylinder and a piston with a chamber therebetween, the cylinder being fixedly connected to said stator and the piston having an end portion forming said gas-film bearing face.

3. A gyro as claimed in claim 2 in which each caging mechanism has a spring means disposed in said cylinder urging said piston away from said rotor for retracting said piston after the spin-up operation.

4. A gyro as claimed in claim 2, in which each caging mechanism has gas supply passage connecting to said chamber supplying gas thereto and urging said piston adjacent to said rotor for final setting of said piston and for rapid formation of said gas film during the caging and spin-up operation.

5. A gyro as claimed in claim 2, in which each caging mechanism has a manual-preset plunger pin engaging said piston for rough setting of said piston adjacent to said rotor to facilitate rapid formation of said gas film during the caging and spin-up operation.

6. A gyro as claimed in claim 1, including
a gas supply bottle having a cylindrical flange with an opening and having an automatic gas release mechanism disposed in said opening.

7. A gyro as claimed in claim 6, in which said gas release mechanism includes:
a diaphragm fixedly connected along its edge to said flange for sealing said opening,
a tubular support column bearing against said diaphragm for preventing shearing of said diaphragm by said gas pressure, and
an electric actuator with a drive rod disposed adjacent to said column and displaceable relative thereto for displacing said column from said diaphragm to permit shearing of said diaphragm,
whereby a high-velocity, high-volume, instantaneous-release gas flow is provided from said bottle to said caging means during said spin-up and caging operation.

8. An optical pickoff means for a two-axis gyro having a rotor and a stator with respective axes having a tilt angle therebetween comprising:
a first pickoff unit with an X-reference axis disposed substantially at right angles to said stator axis and and activated only by tilting of said rotor about X-reference axis, and
a second pickoff unit wtih a Y-reference axis disposed substantially at right angles to a plane including said stator axis and said X-reference axis and activated only by a tilting of said rotor about said Y-reference axis.

9. A pickoff means as claimed in claim 8, in which each said pickoff unit comprises:
a light source,
a light beam focus disposed adjacent said source for providing a narrow-band light beam,
a light beam reflector for reflecting said light beam, and
a light beam receiver.

10. A pickoff means as claimed in claim 9, in which said receiver comprises:
a high-resistive strip with an axis disposed substantially at right angles to a plane including its reference axis and said stator axis,
a low-resistive strip spaced therefrom and disposed substantially parallel thereto and a photoconductive sheet joined to said strips and forming a bed thereunder and composed of a high-resistive material which becomes low-resistive only in a portion thereof exposed to a light beam.

11. A free-rotor gyro including:
a pickoff means as claimed in claim 9,
a stator with a shaft supporting said light source, said light focus and said light receiver of each said pickoff unit, and
a rotor with a universal-joint connection to said shaft supporting said light reflector of each said pickoff unit.

12. A two-axis, free-rotor gyro comprising
a rotor having a spin axis,
a stator for support of said rotor having a stator axis intersecting said spin axis at a pivot point and forming a tilt angle therebetween,
a gas drive means to spin up said rotor,
a gas caging means for positioning said rotor during spin-up,
an optical pickoff means for sensing the tilting of said rotor,
a ball-bearing means providing a low-friction coupling between said rotor and said stator,
a gas supply means for supplying said drive and said cage means,
said rotor having a hub portion with a bearing having a spherically shaped, radially inner bearing surface and a rim portion with an outer edge having a plurality of turbine-bucket grooves,
stator having a shaft with a ball portion having a spherically shaped, radially outer bearing surface separated from said rotor bearing surface by a substantially uniform gap and a base portion with a peripheral wall and a pair of end walls forming a cavity connecting to said supply means,
drive means including a plurality of gas nozzles with respective passages connecting to said cavity being equiangularly spaced about said stator axis for directing their outflow at said turbine buckets, caging means including at least three caging mechanisms with each caging mechanism having a cylinder integral with said stator top wall and a piston received in said cylinder forming a chamber therebetween and having a spring means disposed in said cylinder urging said piston away from said rotor, said cage mechanism piston having an end face with a recess and a conduit connecting thereto for supplying a gas film thereon, said cage mechanism cylinder having a radial passage connecting to said cylinder receiving a plunger manual-preset pin therein for rough caging prior to start-up condition, said gas supply including a gas bottle with a cylindrical flange forming an opening and a gas release mechanism disposed in said opening, said release mechanism including a diaphragm, a two-piece tube assembly for supporting said diaphragm, and an electrical actuator with a drive rod engaging said tubular assembly for removing said support when activated to permit shearing of said diaphragm by said gas pressure, said ball bearing including a pair of ball-bearing units disposed between said rotor bearing surface and said shaft bearing surface, said optical means including a pair of pickoff units with respective pickoff axes disposed substantially at right angles to each other in a plane substantially at right angles to said stator axis, each said pickoff unit including a light source and a light beam focus mounted on said stator, a light beam reflector mounted on said rotor on the under side thereof, and a light receiver mounted on said stator, said light receiver including an elongate bar coil of high-resistive material, an elongate bar member of low-resistive material and a photoconductive sheet forming a bed under said coil and said bar joined thereto, said sheet being composed of a photoconductive material any portion of which normally has a high resistance with said portion having a low resistance when exposed to a light beam.

References Cited
UNITED STATES PATENTS

| | | | |
|---|---|---|---|
| 2,921,472 | 1/1960 | Friedman et al. | 74—5.12 |
| 3,140,853 | 7/1964 | Lindner | 74—5.7 X |
| 3,142,183 | 7/1964 | Dane | 74—5.6 X |
| 3,165,282 | 1/1965 | Noyes | 74—5.6 X |
| 3,276,270 | 10/1966 | Speen | 74—5.7 X |

C. J. HUSAR, *Primary Examiner.*

U.S. Cl. X.R.

74—5.6, 5.43